United States Patent [19]

Tseung et al.

[11] Patent Number: 4,464,239

[45] Date of Patent: Aug. 7, 1984

[54] ELECTROCATALYST

[76] Inventors: Alfred C. C. Tseung, 60 Grove Ave., London, England, N10 2AN; Nagendra P. Rasiyah, 19 Wilberforce Rd., Finsbury Park, London, England, N4; David B. Hibbert, 16 Selkirk Ct., Whitley Rd., London, England, N17

[21] Appl. No.: 550,716

[22] Filed: Nov. 10, 1983

Related U.S. Application Data

[63] Continuation of Ser. No. 486,156, Apr. 20, 1983, abandoned, which is a continuation of Ser. No. 231,536, Feb. 4, 1981, abandoned.

[30] Foreign Application Priority Data

Feb. 11, 1980 [GB] United Kingdom ................. 8004483

[51] Int. Cl.$^3$ ........................ B01J 23/74; H01M 4/58
[52] U.S. Cl. ..................................... 204/129; 204/242; 204/290 R; 204/290 F; 429/42
[58] Field of Search ............... 204/290 R, 290 F, 129, 204/242; 429/42

[56] References Cited

FOREIGN PATENT DOCUMENTS

| 573509 | 12/1958 | Belgium . |
| 17400 | 10/1980 | European Pat. Off. . |
| 2360531 | 3/1978 | France . |
| 859738 | 1/1961 | United Kingdom . |
| 1397793 | 6/1975 | United Kingdom . |
| 1552721 | 9/1979 | United Kingdom . |
| 1570422 | 7/1980 | United Kingdom . |

OTHER PUBLICATIONS

Voloshin et al., Chem. Abs., vol. 84, Abs. 127915s, (1976).
Tamura et al., Chem. Abs., vol. 85, Abs. 110778x, (1976).
Voloshin et al., Chem. Abs., vol. 88, Abs. 52916q, (1978).
Jasem et al., J. Electrochem Soc., vol. 126, No. 8, pp. 1353-1360, Aug. 1979.
Proceedings of Symp. on Electode Mat. and Proc. for Energy Conversion and Storage, Jasem et al., pp. 414-425.

Primary Examiner—John F. Niebling
Attorney, Agent, or Firm—Jordan and Hamburg

[57] ABSTRACT

The invention relates to lithiated cobalto-cobaltic oxides, especially stoichiometric $Co_3O_4$, which have been found to be remarkably efficient electrocatalysts, especially at relatively high total lithium contents of more than 2 atom percent, preferably from 5 to 12 atom percent. The electrocatalysts are especially suitable for oxygen evolution and reduction electrodes and have been found to exhibit long term stability over periods up to 6,000 hours. They are also useful in purely chemical processes such as those involving a decomposition of hydrogen peroxide or peroxyl ions.

10 Claims, 6 Drawing Figures

ELECTROCATALYST

This application is a continuation of application Ser. No. 486,156, filed Apr. 20, 1983, now abandoned which, in turn, is a continuation of application Ser. No. 231,536, filed Feb. 4, 1981, now abandoned.

This invention relates to catalysts, especially electrocatalysts, and to electrocatalytically active electrodes and electrical cells containing such electrodes.

It has previously been proposed to use various compounds, commonly called electrocatalysts, both in order to increase the reaction rate of electrolytic reactions and also to make them take place closer to their thermodynamically predicted potentials. For example, the incorporation of such electrocatalysts into fuel cells enables the cells to operate near to their theoretical potentials even when substantial current is drawn from them, the electrocatalyst reducing the overvoltage for electrode reaction. Similarly, in water electrolysis cells, the incorporation of electrocatalysts reduces the minimum voltage necessary for electrolysis to occur and enables the voltage to be kept low as the rate of electrolysis is increased, thereby facilitating high operational efficiencies.

In other applications, the compounds may be used as purely chemical catalysts, for example for the decomposition of hydrogen peroxide or peroxyl ions. Furthermore, as proposed in British Patent Publication No. ,2,019,441, such compounds may be used in gas extraction cells in which they function both electrochemically and chemically in order to enhance the yield of purified gas and thereby increase the power efficiency.

A water electrolysis cell having an alkaline electrolyte in which the electrode reactions may be written as:

$$2H_2O + 2e \rightarrow H_2 + 2OH^-,$$

for hydrogen evolution, and $$4OH^- \rightarrow O_2 + 2H_2O + 4e,$$

for oxygen evolution, the overall cell reaction being, $$2H_2O \rightarrow 2H_2 + O_2,$$

has a theoretical working voltage of 1.23 volts (25°). A hydrogen/oxygen fuel cell, in which the above electrolyte reactions are reversed and the net reaction is the formation of water, has a similar theoretical powerproducing voltage.

The traditional electrodes which have been employed in such cells are nickel screens which operate at about 2.1 volts at a current density of 200mA/cm² in 45% KOH at 85° C. By coating the nickel screens with various electrocatalysts, typically in the form of a dispersion of the catalytic compound in polytetrafluoroethylene (PTFE), the operating potential can be reduced to around 1.85 volts, at 1A/cm², resulting in a performance which is comparable to that of cells utilising noble metal electrodes, such as platinum, palladium and iridium electrodes the high cost of which has precluded their widespread use, even though attempts have been made to use them more effectively by supporting them on low-cost substrates.

Quite recently, various mixed oxides have been proposed as electrocatalysts, especially those having a spinel structure, including $CoFe_2O_4$ and, especially, $NiCo_2O_4$. Reference may be made for example to British Patent Specifications Nos. 1,014,587 and 1,461,764 and Tseung et al. J. Materials Sci. 7, 1383 (1972) and Tseung and Jasem Electrochimica Acta, 1977, Vol. 22, pp 31–34, the disclosures of which are incorporated herein by reference.

Using a nickel screen electrode coated with a dispersion of $NiCo_2O_4$ in PTFE as an oxygen evolution anode it has been possible to operate at a working voltage of about 1.6 volts at a current density of 1A/cm² at 70° C. using 45% KOH as the electrolyte.

It has also been proposed (see, for example, U.S. Pat. No. 4,132,619) to enhance the stability of these mixed oxide electrocatalysts by so-called "lithiation", i.e. by incorporating a minor amount, e.g. from 0.1 to 2 atom percent, of lithium.

Figure 1:
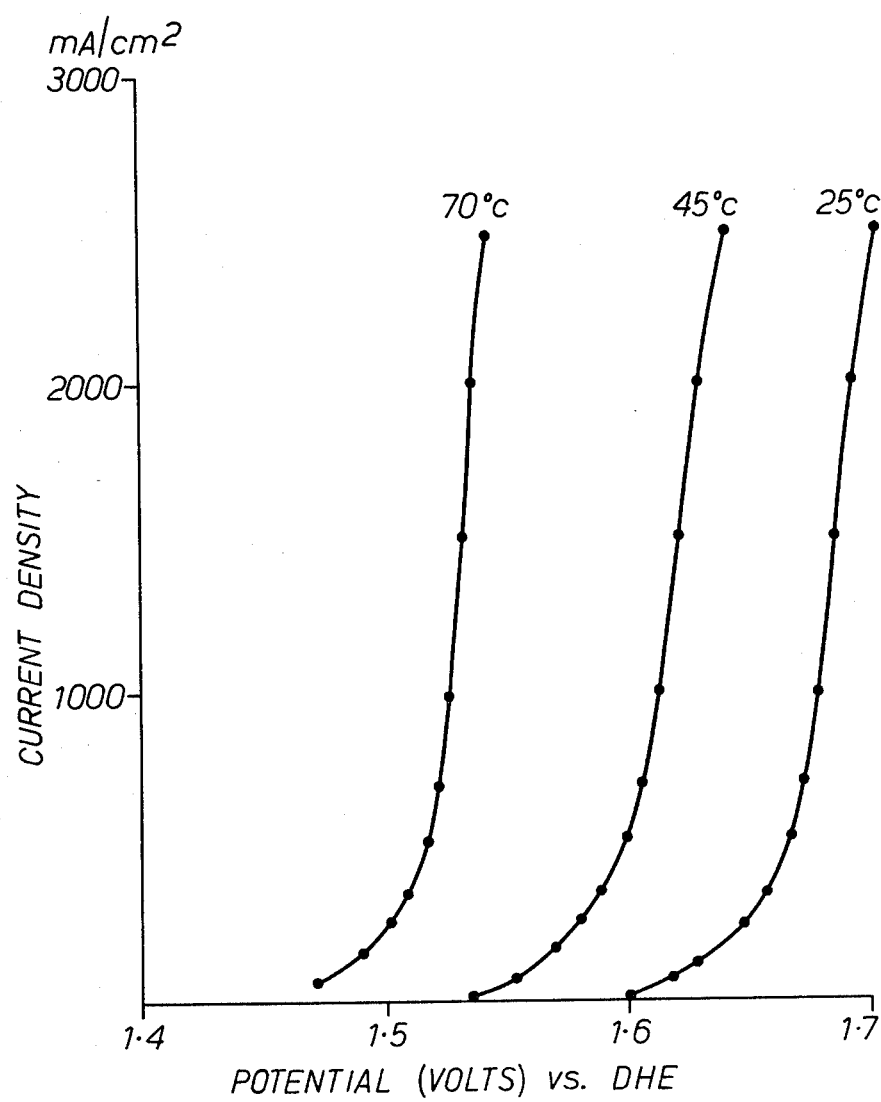
FIG. 1 is a plot of current Density Vs. Oxygen evolution potential.

The present invention provides lithiated cobaltocobaltic oxide, and electrolytic cells, electrodes, and electrochemical and chemical processes employing lithiated cobalto-cobaltic oxide.

The novel lithiated compounds of the present invention are derived from $Co_3O_4$, which may be obtained by heating a decomposible oxysalt of cobalt in air at a temperature below 900° C.; above 900° C., the spinel structure degrades to that of the lower oxide, CoO, with loss of oxygen. For the sake of convenience, therefore, the cobalto-cobaltic oxide will from now on be referred to as $Co_3O_4$, although it will be appreciated that near-stoichiometric variations thereof may also be employed. In this respect, it is though that the present invention may also advantageously be applied to mixed nickel cobalt oxides of the type referred to above, up to and including $NiCo_2O_4$, especially at relatively high lithium contents of 3 atom percent and more, but, again for convenience, the following description will be restricted to lithiated $Co_3O_4$.

The novel lithiated $Co_3O_4$ compounds according to the present invention will usually contain at least 0.5 atom percent lithium based on the total metal content and the lithium content will usually not exceed 20 atom percent.

In this respect, however, although the present invention is primarily based on our suprising discovery that lithiated $Co_3O_4$ is an especially efficient electrocatalyst, it is also based on our further surprising discovery that superior electrocatalytic and other properties can be obtained in the novel lithiated $Co_3O_4$ compounds by employing a degree of lithiation higher than that which has previously been employed in other electrocatalysts. Thus, the lithiated $Co_3O_4$ compounds of the present invention will usually have a lithium content of more than 2 atom percent, for example from 3 to 15 percent. Especially preferred compounds contain from 5 to 12 atom percent Li and, especially, from 6 to 11 atom percent Li, compounds containing about 10 atom percent Li having been found to give especially good results when used in oxygen evolution and reduction electrodes.

Using the electrocatalysts of the present invention it has proved possible to obtain an oxygen evolution half-cell potential of 1.52 volts vs DHE (Dynamic Hydrogen Electrode) at 1A/cm$^2$, as compared with 1.6 volts using NiCo$_2$O$_4$, and, in addition, the electrocatalysts have shown excellent long term stability over periods of up to 6,000 hours.

The compounds of the present invention cannot readily be prepared by co-precipitation methods such as those described in British Patent Specification No. 1,461,764, because of the large difference in solubility between lithium and cobalt (and nickel) salts, but they may, for example, readily be prepared by thermal decomposition or freeze-drying, starting, for example, from a mixture of lithium and cobalt nitrates, generally followed by vacuum decomposition and thermal treatment, e.g. at from 300° C. to 600° C. for from 5 to 10 hours, in order to stabilise the compound and obtain the desired spinel structure.

Another method by which the compounds may be prepared is a "slurry" method in which cobaltic oxide or hydroxide is treated with a solution of lithium hydroxide and the product is heat treated to form the lithiated product. For example, cobalt hydroxide is prepared by precipitation from a soluble cobalt salt, e.g. CoCl$_2$, solution using a suitable hydroxide, e.g. KOH, and then washed with a solution of lithium hydroxide, e.g. a 5 weight % solution, after which it is drained, dried, and finally heated in air.

We have found that lithiated Co$_3$O$_4$ compounds prepared by the slurry method have excellent electrocatalytic properties comparable to those prepared by freeze-drying and, especially, that the method has the very important advantage that the compounds can be prepared by heating at lower temperatures and shorter times than those necessary to obtain the optimum product from a freeze-drying method.

The total lithium content of the lithiated Co$_3$O$_4$ compounds of the present invention will generally be made up of "combined" lithium which occupies cationic sites in the spinel lattice which may previously have been occupied by cobalt ions, and "free" lithium which is believed to be present as LiO in admixture with the spinel. In this respect, although it is the total lithium content which is referred to above, the combined lithium content should also preferably be at least 2 atom percent based on total metal content, with preferred combined lithium contents lying in the range of from 2 to 8 atom percent.

The ratio of "combined" and "free" lithium will vary according to the method of preparation and the conditions of the subsequent heat treatment; for example, it is believed that the combined lithium will increase as the time and temperature of the final heat treatment are increased. It also appears that true lithiation (i.e. incorporation of Li atoms into cation sites in the spinel lattice) of the freeze-dried product occurs to a greater degree than in the products prepared by the thermal decomposition and slurry methods.

The total, free, and combined lithium contents can readily be determined by analysis. For example, the sample can be leached in dilute acetic acid in order to remove free lithium, which can be determined by atomic absorption analysis of the leached solution. The combined lithium can similarly be determined by dissolving the remaining solid in aqua regia, with atomic absorption analysis of the resulting solution. The total lithium content can be obtained by adding the free and combined lithium contents or, if desired, can simply be determined by dissolving a portion of the sample in aqua regia, followed by atomic absorption measurement.

It will be appreciated that the lithiated Co$_3$O$_4$ electrocatalysts of the present invention may be used in those applications where other electrocatalysts, e.g. NiCo$_2$O$_4$, have previously been employed and that they may be used to fabricate electrodes by methods similar to those previously used for those other electrocatalysts. For example, they may be applied as powders, optionally in admixture with graphite or another electrocatalyst, in polymeric dispersion, e.g. polytetrafluoroethylene (PTFE) dispersion, to supports, e.g. nickel screens, which are dried and then cured to form polymer-bonded electrodes.

It will be appreciated that they may be employed as catalysts in chemical processes, e.g. in the decomposition of hydrogen peroxide, as well as in combined electrochemical/chemical cells and processes, e.g. of the type described in British Patent Publication No. 2,019,441.

As will be seen from the following Examples, although the efficiency of the novel lithiated Co$_3$O$_4$ compounds varies according to the lithium content, it is possible to obtain significant reductions in oxygen evolution potential as compared with the use of NiCo$_2$O$_4$, especially when the lithium content falls within the preferred ranges. The new lithiated compounds thus promise great savings in efficiency in both electrolysis and fuel cells, especially those employing oxygen evolution and reduction electrodes, as well as in other applications such as secondary cells, e.g. metal-air batteries, and chemical processes involving oxidation and reduction reactions.

The following Examples illustrate the invention.

EXAMPLE 1

This Example illustrates the preparation of a lithiated Co$_3$O$_4$ electrocatalyst in accordance with the present invention.

The appropriate equantities of cobalt nitrate and lithium nitrate solution required to give 10 g of 7% lithiated cobalt oxide were sprayed into liquid nitrogen and the frozen mixed nitrate solution thereby obtained was kept in several flasks under vacuum until all the ice had been sublimed. The dried mixed nitrate was subsequently decomposed under vacuum for one hour at 300° C. Finally, the powder was cured in air for 10 hours at 500° C. in order to obtain thd desired spinel structure.

The same technique was used to prepare electrocatalysts containing different percentages of lithium and similar samples were also prepared by thermal decomposition of the nitrates followed by vacuum decomposition and thermal treatment.

For comparison, samples of pure Co$_3$O$_4$ were also prepared from cobalt nitrate by each of the above methods.

The following Table 1 shows measured powder resistivities of the various electrocatalysts thereby prepared.

TABLE 1

| Nominal Li Content (Atom %) | Powder Resistivity (ohm-cm) | |
|---|---|---|
| | Thermal Decomposition | Freeze Drying |
| 0 ($Co_3O_4$) | 4,800 | 10,000 |
| 1 | 210 | — |
| 2 | 65 | — |
| 4 | 20 | 10 |
| 7 | 15 | 1 |
| 10 | 5 | 1 |
| 15 | — | 90 |

The above results appear to indicate that the freeze-drying technique gives electrocatalysts having a desirably lower resistivity as compared with those prepared by the thermal decomposition technique.

EXAMPLE 2

The various electrocatalysts prepared by freeze-drying were then evaluated for oxygen evolution performance, as follows. Each powdered electrocatalyst was mixed with PTFE dispersion (Fluon (Registered Trade Mark) ex ICI) and was then painted onto a 100 mesh (British Standard) nickel screen, dried at 110° C. for one hour and then cured at 300° C. for one hour in air in order to form a PTFE-bonded electrode. The catalyst/PTFE weight ratio was 10/3 in each case although, of course, other ratios can be employed.

The nickel screens used in this Example were themselves lithiated prior to being coated with the electrocatalyst. The lithiation of the screens was carried out by immersing them in lithium hydroxide solution (although solutions of other lithium salts could be used) drying in air, re-immersing the screens in the lithium solution, drying in air, and then heating in air eg at 600-700° C. for about 2 hours.

The electrode was then immersed in a thermostated glass cell containing 45% KOH, prepared from Analar Grade KOH, and distilled, deionized water. A 5×5cm platinum foil was used as the counterelectrode.

The potential of the working electrode was controlled by a 3A Chemical Electronics potentiostat and was measured against a Dynamic Hydrogen Electrode (DHE). For steadystate measurements (i.e. IR corrected values) an interrupter technique (see K.R. Williams "An Introduction to Fuel Cells" P. 58, Elsevier, New York (1966) was used to measure the ohmic drop between the Luggin capillary and the working electrode.

The following Table 2 shows the results obtained:

TABLE 2

| Li Content (Atom %) | Oxygen Evolution Performance Potential Volts at 1A/cm² at 70° O (iR corrected) |
|---|---|
| 0 ($Co_3O_4$) | 1.69 |
| 4 | 1.56 |
| 7 | 1.535 |
| 10 | 1.52 |
| 15 | 1.584 |

It will be seen that the 7 and 10% lithiated catalysts gave especially good results.

EXAMPLE 3

The 7% freeze-dried sample was further evaluated for its oxygen evolution potential at varying current densities and temperatures, the results being shown in FIG. 1. At 70° C. this electrocatalyst can be seen to operate at a fairly constant potential of around 1.53 volts as compared with the figure of 1.6 volts for a similarly prepared PTFE-bonded $NiCo_2O_4$ electrode tested under the same conditions.

In addition, this 7% Li electrode was tested under similar conditions (i.e. 45% KOH, 70° C.) over a period of 11 days. The results of this testing are given in Table 3 below.

TABLE 3

| Day | Half Cell Potential Volts | Resistance iR(mV) | Half Cell Potential Volts (iR corrected) |
|---|---|---|---|
| 1 | 1,561 | 30 | 1,531 |
| 2 | 1,543 | 28 | 1,515 |
| 3 | 1,556 | 33 | 1,523 |
| 4 | 1.55 | 30 | 1.520 |
| 5 | 1.556 | 36 | 1.52 |
| 6 | 1.551 | 30 | 1.521 |
| 8 | 1.556 | 32 | 1.531 |
| 9 | 1.559 | 30 | 1.529 |
| 10 | 1.563 | 34 | 1.529 |
| 11 | 1.567 | 35 | 1.532 |

Bearing in mind that these results might have been affected by the formation of relatively non-conducting nickel oxide film on the nickel screen, the performance stability shown in remarkable.

EXAMPLE 4

A 7% Li $Co_3O_4$ electrocatalyst (prepared as in Example 2 above by freeze-drying) was tested as the anode in a water electrolysis cell. The cathode was a PTFE-bonded $NiCo_2S_4$ of the type described and claimed in British Pat. No. 1,556,452; the anode/cathode separation was 0.5cm and the electrolyte employed was 5N KOH at 70° C.

At a current density of 1A/cm² the full cell voltage was 1.89 volts (1.58 volts iR corrected). These figures were in agreement with iR corrected results obtained for the individual anode and cathode, i.e. 1.53 volts and −0.05 volts respectively.

This result appears to be far better than any hitherto reported in the prior art under similar test conditions.

EXAMPLE 5

A lithiated $Co_3O_4$ electrocatalyst was prepared by freeze-drying a mixed nitrate solution containing 90 atom percent $Co^{++}$ and 10 atom percent $Li^+$. The resulting product was found on analysis to contain 6.6 atom percent lithium.

Using the method described in Example 2, the electrocatalyst was used to form a PTFE-bonded electrode at an electrocatalyst loading of about 15mg/cm².

The electrode was then used as an anode in an electrolytic cell with a PTFE-bonded $NiCo_2S_4$ cathode and 45% KOH as the electrolyte. The cell was then subjected to a long term stability test over 6,000 hours at 85° C. and at a current density of 1A/cm².

Figure 2:
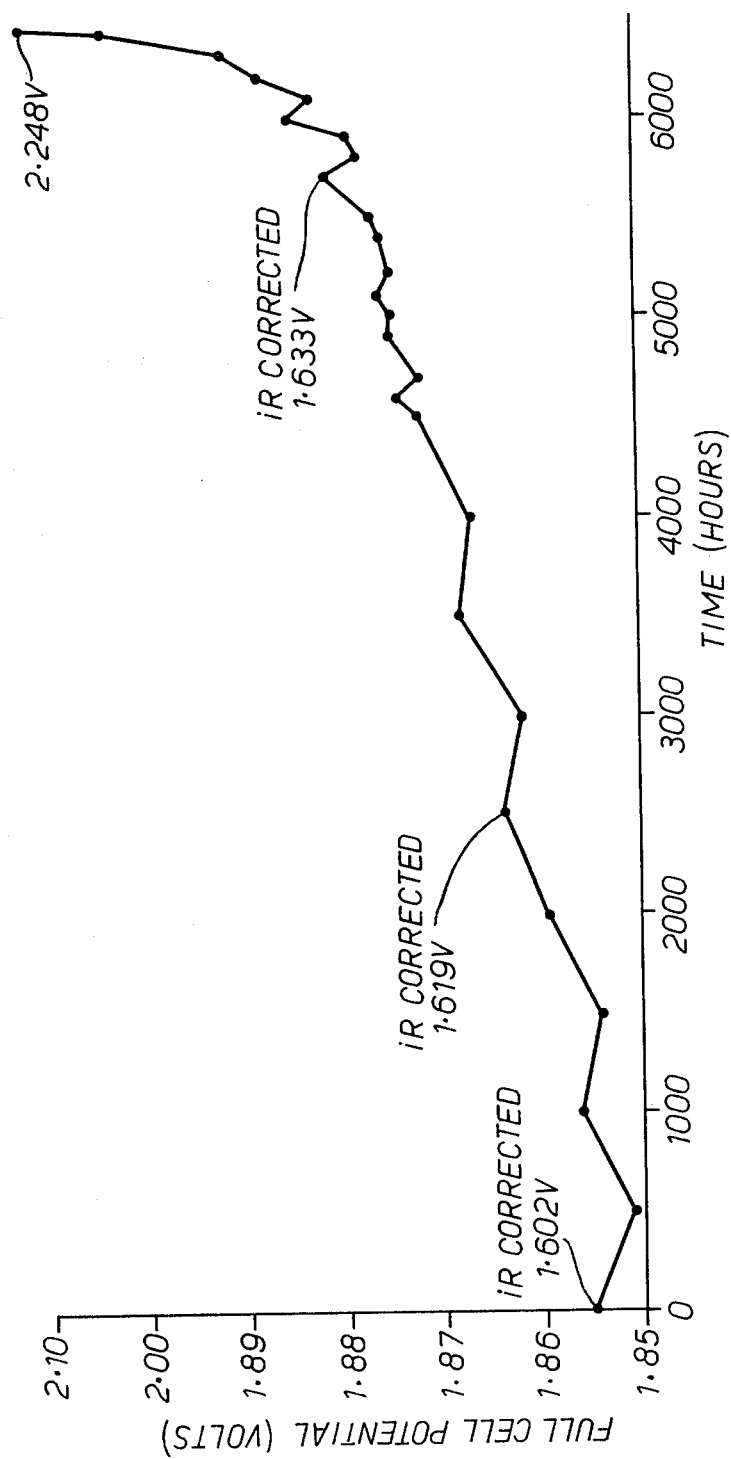
FIG. 2 is a plot of full-cell potential Vs. Time.

The results of the test are shown in FIG. 2, which is a plot of full-cell potential vs time. The curve show is not generally iR corrected but the three values shown were checked in this respect and the appropriate figures are indicated.

It will be seen that the cell showed very good stability up to about 5,800 hours, after which the performance deteriorated rapidly. However, it is though that this deterioration can largely be attributed to mechanical attrition of the cathode rather than significant changes in the anode electrocatalyst.

Figure 3:
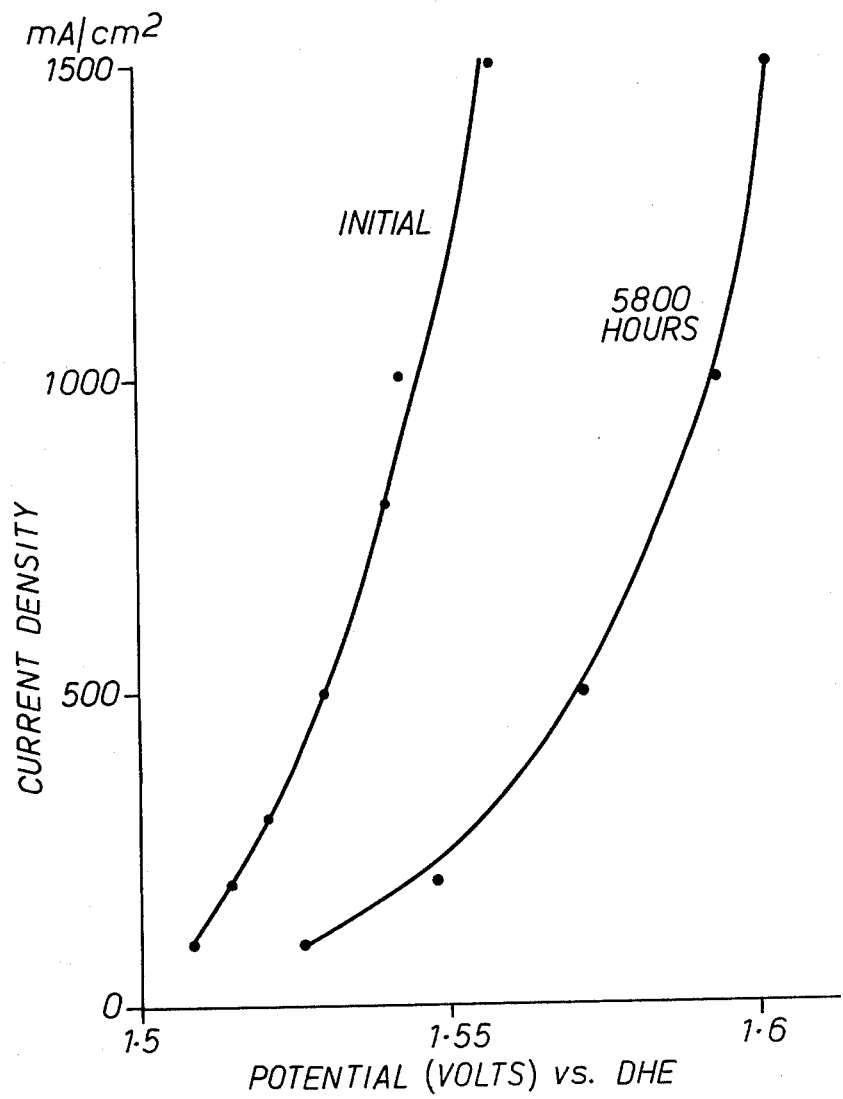
FIGS. 3 and 4 are plots of Current Density Vs. oxygen Evolution Potential.

Support for this view can be found from FIG. 3 which shows the half-cell oxygen evolution plot of a similar PTFE-bonded lithiated $Co_3O_4$ anode, initially and after 5,800 hours of continuous running at a current density of $1A/cm^2$ in 45% KOH at 85° C. In this case the values were iR corrected.

It will be seen that the deterioration in performance of this anode after 5,800 hours was remarkably small. Thus, although the half-cell potential at $1A/cm^2$ increased from an initial value of 1.543 volts to 1.594 volts after 5,800 hours, the latter value is still less than the value of 1.6 volts which is typically obtained using a $NiCo_2O_4$ catalyst. Analysis showed that the total lithium content of the electrocatalyst after 5,800 hours remained at about 6.6 atom percent. These results are illustrative of the remarkable long term stability afforded by the electrocatalysts of the present invention.

EXAMPLE 6

This Example illustrates the preparation and properties of an electrocatalyst according to the present invention prepared by a slurry method.

180 g of $CoCl_2$, $6H_2O$ (Analar) was dissolved in 500cc of water and the resulting solution was added, with constant stirring, to a solution of 100 g KOH in 500cc of water. The resulting precipitate (which was initially blue but gradually turned pink) was filtered and washed in a Buchner funnel connected to a water pump until it was free of KOH. The precipitate was then drained to free it of water.

A lithium hydroxide solution was prepared by dissolving 6 g of $LiOH.H_2O$ (Analar) in 100cc of water. This solution was then added to the $Co(OH)_2$ precipitate in the Buchner funnel until all the solution had drained through the funnel. The Buchner funnel was again connected to the water pump for another 10 minutes and then the precipitate was dried at 105° C. for 5 hours in air. 4 g batches were then heated at various temperatures to form lithiated $Co_3O_4$ products.

The following method was then used to evaluate the lithium content of those products.

2 g of the lithiated $Co_3O_4$ sample was added to a beaker containing 100 cc of 10% (volume/volume) acetic acid. The contents of the beaker were heated to 60° C. and vigorously stirred, using a magnetic stirrer, for 30 minutes. The lithiated oxide was then washed and the filtrate was made up to 1000cc. The lithium content of the filtrate was then analysed using a Perkin Elmer 370 Atomic Absorption Meter. Because the acetic acid leaching removes only uncombined lithium, the results give the free lithium content of the sample. 0.2 g of the lithiated $Co_3O_4$ sample were then dissolved in 25 cc of aqua regia at 80° C. for 20 minutes and the resulting solution was analysed for lithium content as above. Because the aqua regia dissolved all the lithium in the sample, the results indicate the total lithium content. The combined lithium content was then calculated as the difference between the "total" and "free" values.

By way of comparison, samples of lithiated $Co_3O_4$ prepared by freeze-drying and thermal decomposition of a mixed nitrate solution were also analysed in the above manner and the surface area and resistivity of all the samples was measured.

The results, shown in Table 4, indicate that the thermal decomposition method gives products of a lower surface area and a higher resistivity than those prepared by the freeze-drying method when the products have a similar total lithium content and are subjected to the same heat treatment (600° C. for 10 hours). This suggests that true lithiation (i.e. insertion of lithium ions into the spinel structure) takes place at lower temperatures in the freeze-dried products.

Of particular interest is the fact that the samples prepared by the slurry method exhibit excellent surface area and resistivity values even when heated at 300° C. for 5 hours. Thus, it would appear that, despite the relatively high "free" lithium content of these samples, sufficient true lithiation has taken place to provide an electrocatalyst having the desired properties.

TABLE 4

| | Characteristics of Lithiated $Co_3O_4$ prepared by Various Methods | | | | | | |
|---|---|---|---|---|---|---|---|
| | Thermal Decomposition | Freeze-Drying | | | Slurry | | |
| | 600° C./10 hrs | 400° C./5 hrs | 500° C./10 hrs | 600° C./10 hrs | 300° C./5 hrs | 400° C./5 hrs | 500° C./5 hrs |
| Surface Area BET $m^2/g$ | 2.7 | 26.2 | 13.6 | 13.8 | 52.5 | 36.2 | 13.3 |
| Resistivity ohm-cm | 7.4 | 33.0 | 5.3 | 2.3 | 3.4 | 2.4 | 0.8 |
| Total Hours Atom % | 8.9 | — | — | 9.2 | 8.1 | 10.3 | 10.78 |
| Free Li Atom % | 1.7 | — | — | 2.7 | 5.4 | 7.4 | 6.5 |
| Combined Li Atom % | 7.1 | — | — | 6.3 | 2.4 | 3.0 | 2.0 |

If desired, the free lithium can be removed by dilute acetic acid before the electrocatalyst is used to prepare an electrode but in most cases this will not be necessary.

As mentioned above, the fact that such an electrocatalyst can be obtained by a heat treatment which is carried out at a lower temperature and a shorter time than is necessary for the freeze-dried products represents a considerable economic advantage.

EXAMPLE 7

Figure 4:
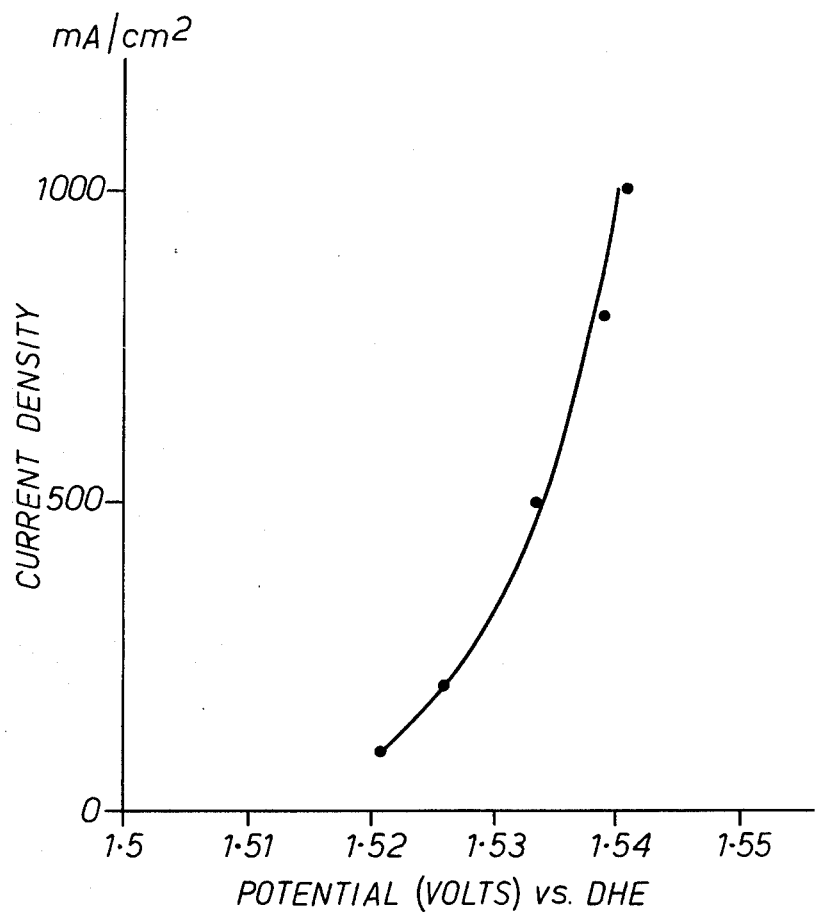
Figure 5:
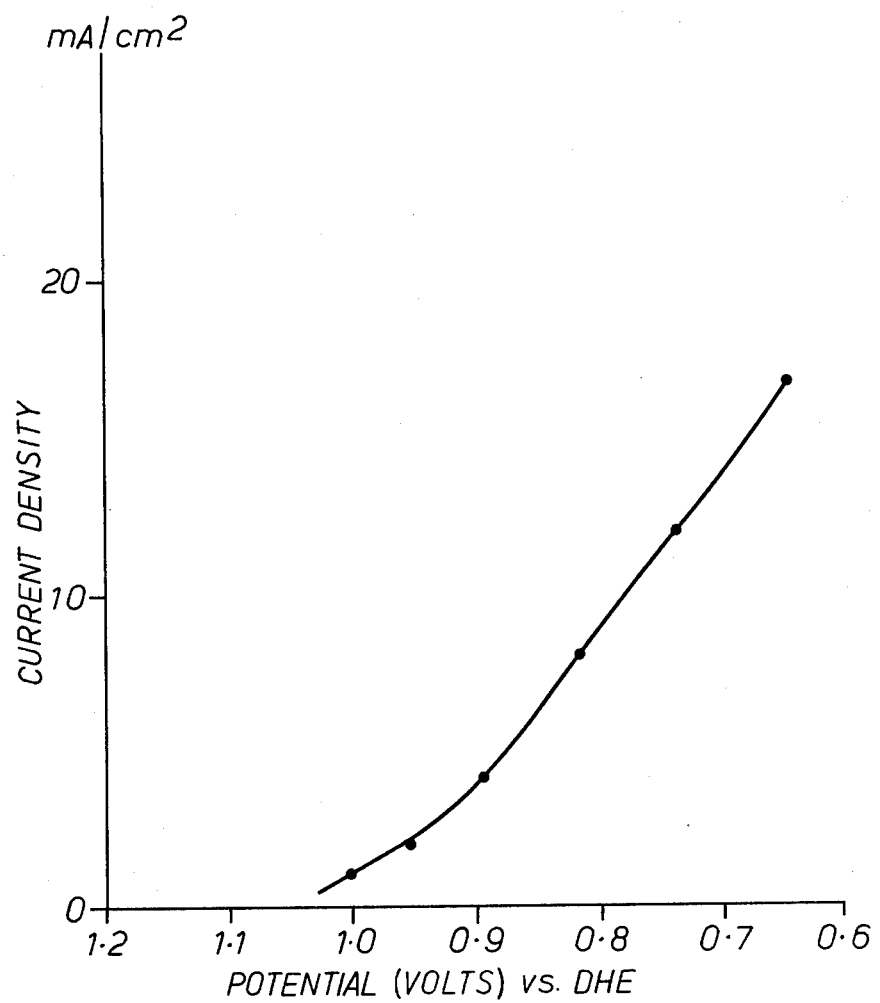
FIG. 5 is a plot of Current Density Vs. Oxygen Reduction Potential.

FIGS. 4 and 5 illustrate the half-cell oxygen evolution and reduction performances, respectively, of a lithiated $Co_3O_4$ electrocatalyst prepared by the slurry method described above. The electrocatalyst, which was prepared by thermal treatment at 300° C. for 5 hours, was found to contain 2.5 atom percent of lithium and had a BET specific surface area of $52.5cm^2/g$ and a resistivity of 3.4 ohm.cm.

The electrocatalyst was used to prepare PTFE-bonded electrodes as described in Example 2 above, at a loading of $17mg/cm^2$ for the oxygen reduction electrode and $16m^2g$ for the oxygen evolution electrode.

The electrolyte in the oxygen evolution cell was 5 N KOH, and the operating temperature 70° C. The oxygen reduction cell was operated at room temperature using air, and 5 N KOH as the electrolyte. In each case the values shown are iR corrected.

It will be seen that the oxygen evolution performance of the electrocatalyst is extremely good, giving 1.54 volts vs DHE at 1A/cm$^2$.

FIG. 5 shows that the electrocatalyst is also active for the reduction of oxygen.

These results confirm the extremely interesting and advantageous properties possessed by the lithiated $Co_3O_4$ compounds prepared by the slurry method.

EXAMPLE 8

An electrode was prepared as follows. 30 parts by weight of a powdered lithiated $Co_3O_4$ prepared by freeze-drying of a mixed nitrate solution and having a total lithium content of 6.3% were intimately mixed with 70% by weight graphite powder and the resulting mixture was dispersed in PTFE and painted onto a 100 mesh nickel screen at a loading of 16 mg/cm$^2$. A comparison electrode using 100% graphite at the same loading was also prepared.

Figure 6:
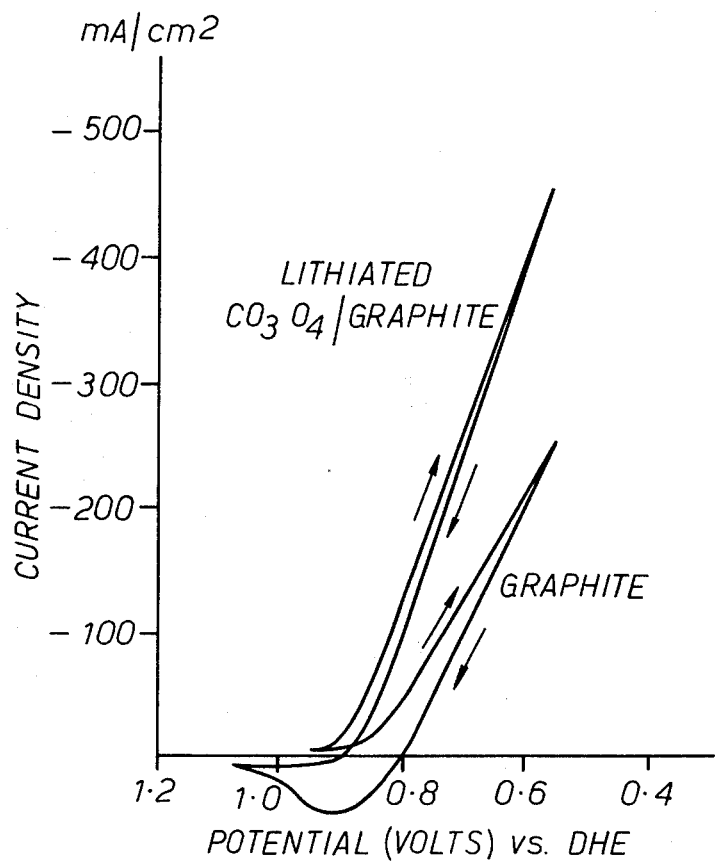
FIG. 6 is a Cyclic Voltammogram showing Plots of Current Density Vs. Oxygen Reduction Potential.

FIG. 6 is a cyclic voltammogram showing the oxygen reduction performances of the two electrodes using air, and 5 N KOH at 18° C. as the electrolyte. The sweep rate was 10 mV/sec. The curves are iR corrected.

The cyclic voltammetry results indicate that the electrocatalyst according to the present invention is stable at oxygen reduction potentials (vs DHE) from the open current voltage of 1.1 volt, t 500 mV.

We claim:

1. In an apparatus including means for electrochemical oxygen evolution, said means comprising an oxygen evolution electrode, the improvement in which the electrode comprises a lithiated cobalto-cobaltic oxide of the spinel structure.

2. In an apparatus according to claim 1, the improvement wherein said lithiated cobalto-cobaltic oxide electrode comprises a support carrying a coating of a polymeric matrix having said lithiated cobalto-cabaltic oxide dispersed therein.

3. In an apparatus according to claim 1, the improvement wherein said lithiated cobalto-cobaltic oxide has a total lithium content greater than 2 atomic percent based on the total metal content.

4. In an apparatus according to claim 1, the improvement wherein said lithiated cobalto-cobaltic oxide has a total lithium content of 3 to 15 atomic percent based on the total metal content.

5. In an apparatus according to claim 1, the improvement wherein said lithiated cobalto-cobaltic oxide has total lithium content of 5 to 12 atomic percent based on the total metal content.

6. In an apparatus according to claim 1, the improvement wherein said lithiated cobalto-cobaltic oxide has a total lithium content of 6 to 11 atomic percent based on the total metal content.

7. In an apparatus according to claim 1, the improvement wherein said lithiated cobalto-cobaltic oxide has a combined lithium content of at least 2 atomic percent based on the total metal content.

8. In an electrochemical cell having an oxygen evolution electrode, the improvement wherein said electrode comprises a lithiated cobalto-cobaltic oxide of the spinel structure.

9. In an electrochemical cell according to claim 8, wherein said lithiated cobalto-cobaltic oxide electrode comprises a support carrying a coating of a polymeric matrix having lithiated cobalto-cobaltic oxide dispersed therein.

10. The cell of claim 8, wherein said electrode is prepared by: treating $Co(OH)_2$ or $CoO_4$ with a solution of LiOH; draining; drying; and heating the resulting product for from 5 to 10 hours at 300° to 600° C.; powdering the resulting lithiated cobalto-cobaltic oxide; mixing said oxide with a dispersion of polytetrafluoroethylene resin; applying the resulting mixture onto a lithiated nickel support and drying and curing the resulting assembly to form a resin-bonded assembly with said oxide dispersed in said resin.

* * * * *